(No Model.)
B. F. & M. F. SPARR.
AIR PUMP FOR PNEUMATIC TIRES.
No. 539,555. Patented May 21, 1895.
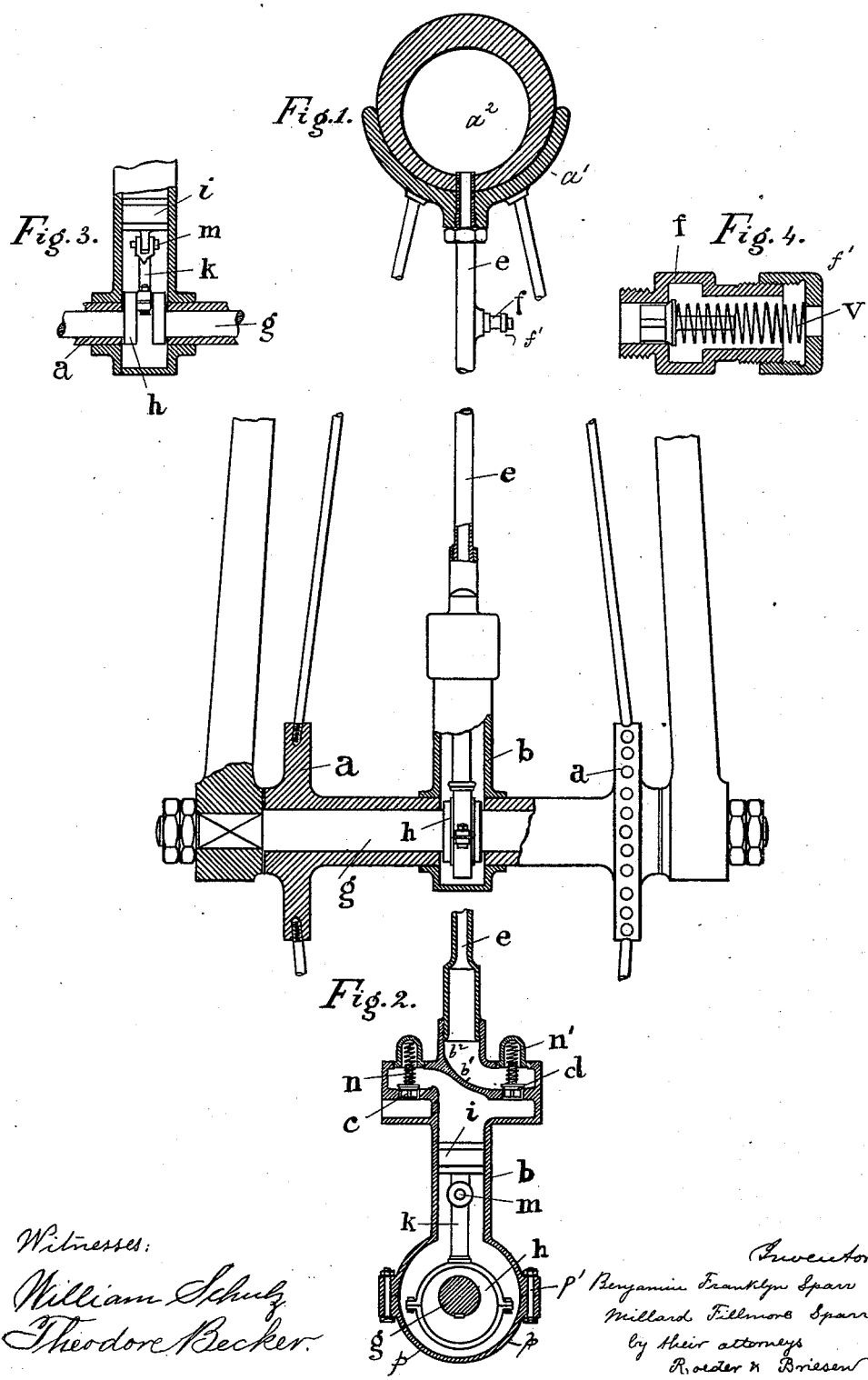

UNITED STATES PATENT OFFICE.

BENJAMIN FRANKLYN SPARR AND MILLARD FILLMORE SPARR, OF BROOKLYN, NEW YORK.

AIR-PUMP FOR PNEUMATIC TIRES.

SPECIFICATION forming part of Letters Patent No. 539,555, dated May 21, 1895.

Application filed July 19, 1894. Serial No. 517,975. (No model.)

*To all whom it may concern:*

Be it known that we, BENJAMIN FRANKLYN SPARR and MILLARD FILLMORE SPARR, residing at Brooklyn, in the county of Kings and State of New York, have invented new and useful Improvements in Air-Pumps for Pneumatic Tires, of which the following is a specification.

This invention relates to an air pump operated by the revolving shaft of a light carriage or bicycle and adapted to inject a continuous charge of air automatically into the pneumatic tire of the vehicle-wheel, as the latter is revolved.

In the accompanying drawings, Figure 1 is a cross-section of part of a pneumatic-tire wheel, partly in elevation, provided with our improvement. Fig. 2 is a vertical transverse section through the pump; Fig. 3, a section of the lower part of the pump, taken at right angles to Fig. 2; and Fig. 4, a longitudinal section through the safety-valve.

The letter $a$, represents the hub of a bicycle or light carriage wheel, of which $a'$, is the rim and $a^2$, the pneumatic tire. Combined with or fitted to the hub $a$, is the body $b$, of a single acting air pump, provided with inlet valve $c$, controlled by spring $n$, and an outlet valve $d'$ within partition $b'$, and controlled by spring $n'$. The valve $d$, conveys the air into a duct $b^2$, from which it enters a pipe $e$, that leads to the tire $a^2$. The fixed shaft $g$, of the wheel is surrounded by a crank or eccentric $h$, the strap of which is connected to the plunger or bucket $i$, by means of a rod $k$, and bolt $m$. The piston rod $k$, passes into the cylinder through a perforation of the hub, that is inclosed by the lower end of the cylinder.

The revolution of the wheel will cause the piston of the air pump to be reciprocated, so that during each down stroke, air is drawn into the pump cylinder through valve $c$, while during each upstroke, the air is forced into the tube $e$, through valve $d$. Thus the pneumatic tire is continuously and automatically charged as long as the wheel is propelled.

To properly inclose the strap and eccentric and create a working chamber, we bolt to the pump $b$, a cap $p$, by bolts $p'$, that embraces one half the hub $a$, the other half of said hub being embraced by the enlarged semi-circular inner end of the cylinder $b$. In this way, the pump and cap form in effect a chamber that surrounds the hub and effectively protects its contents, viz., the strap, eccentric and piston rod against dust.

In order to regulate the air pressure, we provide the tube $e$, with a valve $f$, which is controlled by a spring $v$, the tension of which may be adjusted by a screw cap $f'$.

Pneumatic tires of bicycles or vehicle wheels, provided with this continuously acting air pump will never become slack even on the longest trips, while the ordinary pneumatic tires must be frequently replenished.

What we claim is—

The combination in a pneumatic wheel having a fixed shaft and a surrounding revoluble perforated hub, with a pump cylinder mounted upon the hub and having an inner semi-circular extension, a cap bolted thereto to form a chamber, an inclosed eccentric mounted upon the shaft, a strap surrounding the eccentric and a piston rod operated by the strap and entering the pump cylinder, substantially as specified.

In testimony whereof we have signed our names to this specification in the presence of two subscribing witnesses.

BENJAMIN FRANKLYN SPARR.
MILLARD FILLMORE SPARR.

Witnesses:
WILHELM KOCH,
FERNANDUS KOCH.